Figure 1:
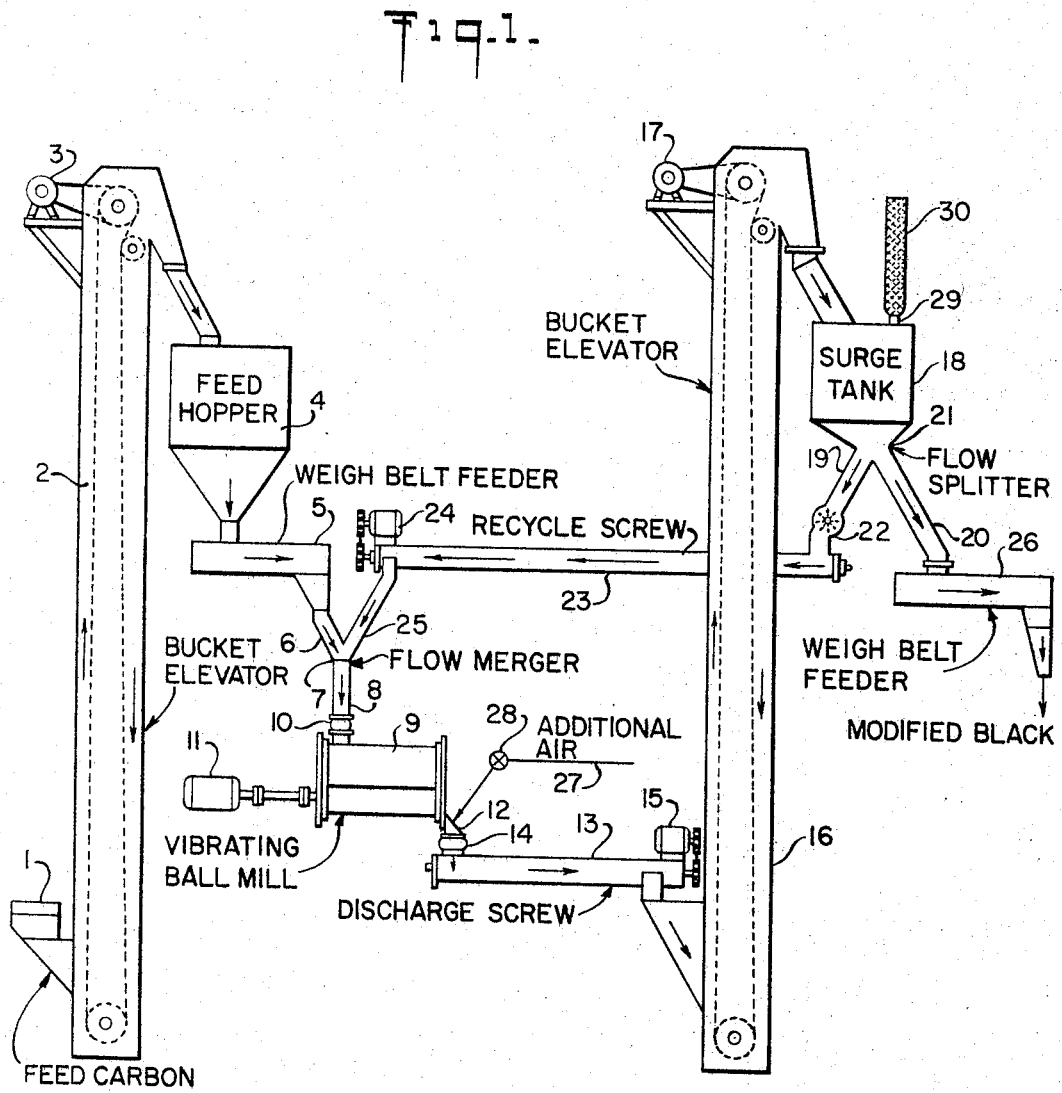

United States Patent Office

3,333,979
Patented Aug. 1, 1967

3,333,979
METHOD OF TREATING CARBON BLACK
Hugh E. Milligan, Monroe, La., assignor to Columbian Carbon Company, New York, N.Y., a corporation of Delaware
Filed Sept. 10, 1963, Ser. No. 307,633
12 Claims. (Cl. 106—307)

This invention relates to a novel and highly effective process for treating carbon black, and more particularly, to improvements in treatment processes of the general type whereby the physical, chemical and rubber properties of carbon black are modified by subjecting the black to attrition by hard surfaces.

It has long been recognized that carbon blacks, and especially furnace blacks, vary greatly as to their particular characteristics and combinations of characteristics. These characteristics are primarily dependent upon the particular method, operating conditions and raw materials used in the manufacture of the black.

It is also well known that the reinforcing properties of carbon black in rubber are associated with three fundamental carbon black properties, specifically, chemical activity, "structure" and surface area. A detailed discussion of these fundamental properties and the laboratory tests for evaluating them appear in the papers published in "Rubber Age" (New York), entitled "The Carbon Spectrum for the Rubber Compounder," vol. 55, No. 5 for August 1944, beginning on page 469, and "The Role of Carbon Structure—Effects of Lowered Structure," vol. 89, No. 2, for May 1961, beginning on page 269.

Briefly, in reference to these properties, the chemical activity of carbon black is influenced mainly by its volatile content which typically consists of the oxides of carbon together with small amounts of methane, nitrogen, hydrogen and uncombined oxygen. Generally, as the volatile content of carbon black is increased, the chemical activity of the black is increased and the cure rate of the rubber compound in which the black is formulated is decreased.

The "structure" property may be defined as a linking together of the carbon particles to form chains or clusters which persist even after the black is incorporated into the rubber with severe milling, and is usually evaluated by the oil absorption characteristics of the black. When comparing carbon blacks of essentially the same particle size, low oil absorption indicates low structure and a low modulus development property in rubber compounds, while high oil absorption indicates opposite properties. In general, carbon blacks produced from natural gas have normal structure and carbon blacks produced from aromatic oils have high structure.

The surface area of carbon black is primarily dependent on the diameter and porosity of the particles, and may be evaluated by the low temperature nitrogen adsorption isotherm, commonly known as the B.E.T. method. Generally, the higher the total surface area of the carbon black, the greater is its rubber reinforcing characteristic.

Carbon blacks which have the properties of low structure, high surface area and high chemical activity are becoming increasingly more popular with the rubber compounder, particularly in the compounding of butyl rubber—a rubbery copolymer of a major proportion of an iso-olefin, advantageously isobutylene, and a minor proportion of a multiolefin, advantageously isoprene. Moreover, blacks having this combination of characteristics may be used with considerable advantage as reinforcing agents for natural rubber and other elastomers. When used for this purpose, the rubber properties developed closely resemble those developed in channel black reinforced stocks.

It is well known that the structure characteristics of carbon black may be altered by subjecting the carbon black to attrition by hard surfaces. It is also known that by the same operation, and incidental to the reduction of structure, the B.E.T. surface area and the chemical activity of the carbon black may also be advantageously altered.

For instance, it has previously been proposed to drastically attrite carbon black in a rotary ball mill in the presence of an oxygen-containing gas to produce a black particularly suited for compounding in butyl rubber and halogenated butyl rubber. As a result of this treatment, carbon black structure, as determined by the oil absorption test, is decreased, B.E.T. surface area is increased and chemical activity, as indicated by a change in the volatile content of the black, is increased. However, this process is a batch operation, and is characterized by long treatment times, low production rates and consequently, high operating cost and capital investment.

More recently, an improved process for modifying the properties of carbon black by attritioning has been proposed, which comprises subjecting the black to a rapid succession of violent, multidirectional shearing and shattering impacts of hard-surfaced objects, advantageously steel balls, in a vibrating ball mill. This process is decidedly more effective than heretofore proposed attritioning procedures, and provides a modified carbon black product having excellent rubber properties in a greatly reduced milling time.

Heretofore, the vibratory ball milling of carbon black has been accomplished by a batch operation, or continuously by feeding the carbon black to be treated to and through a mill chamber containing the balls while violently vibrating or oscillating the mill chamber, the rate at which the black is passed through the mill being dependent upon the desired extent of modification of the black. If desired, the black to be treated may be passed repeatedly through the same vibratory ball mill, or through several mills connected in series whereby the discharge stream from one mill becomes the feed stream to another mill.

My present invention provides an improved process for continuously modifying the properties of carbon black by attrition which permits higher production rates and less attention of the operator than do batch or continuous operations previously employed for this purpose. Another marked advantage of my process is the ease with which the degree of carbon black property modification can be varied or controlled by the operator according to the properties desired in the product. Various other objects and advantages of the invention will appear from the following detailed description thereof, and the novel features thereof will be particularly pointed out hereinafter in connection with the appended claims.

Briefly, in accordance with this invention, an enclosed stream of carbon black is continuously circulated at a relatively constant mass rate through an enclosed essentially dust-tight attrition mill wherein the black is subjected to a severe attritioning action by hard-surfaced objects to break up chains or clusters of the carbon black particles and thereby reduce the structure characteristic of the black. While the stream of carbon black is circulating, a measured proportion thereof is continuously recovered as the modified carbon black product and unmodified feed carbon black is introduced into the circulating stream at essentially the same rate at which the product is removed therefrom. It will be noted that, in accordance with the present invention, the modified carbon black product is not recovered by classifying the circulating stream to discriminately separate carbon black particles having selected characteristics, which is to say that although a treated carbon black product is recovered by separating a portion of the attrited carbon black particles that continuously discharge from the mill, the separation of the particles is indiscriminate as regards particle size, degree of property alteration, etc. Also, as can be seen from the description of the invention with reference to the drawings, neither is it necessary to discriminately separate the particles of the recirculated portion of the attrited carbon black prior to reintroduction into the attrition mill.

The enclosed continuously circulating stream of black is advantageously passed through the attrition mill at a mass rate which is substantially higher than the mass rates at which the unmodified feed carbon black and the modified carbon black product are, respectively, continuously added to and recovered from the system, thereby subjecting the majority of the carbon black particles within the stream to a number of passes through the mill.

Therefore, the treated carbon black of the present invention consists of carbon black particles which have been subjected to various amounts of attrition, e.g., the bulk of the modified black product is subjected to several passes through the attrition mill, but one portion thereof is subjected to only one pass, another portion to two passes, another to three passes, etc. As a result, the final carbon black product is composed of black particles having a broad range of attrition modified properties, as distinguished from products obtained from batch or previously employed continuous operations which are composed of particles subjected to essentially the same amount of attrition.

That is to say, the carbon black particles comprised by the products of the present invention are characterized by a distribution of surface area, structure and chemical activity characteristics, and I have found that even though the average values of these characteristics, as compared to the respective characteristics of an essentially uniformly treated black, may appear to be the same, the performance of my product in rubber is at least equivalent, and is frequently superior. Also, as previously noted, the modified black may be produced at significantly higher rates while maintaining a more exacting control over the treating process.

Vibratory ball mills are particularly suitable for the purpose of the invention, although it is to be understood that other types of attritioning mills, such as steel roll mills or rotary ball mills may be suitably adapted and also employed.

Vibratory ball mills are well-known and need not be described in great detail. While generally any type of vibrating ball mill may be employed, it should comprise an essentially dust-tight milling chamber for containing the hard-surfaced objects and the carbon black, means for continuously charging and discharging carbon black to and from the milling chamber, and means for vibrating or oscillating the milling chamber so that the hard surface objects therein are violently agitated and caused to carom off the walls of the chamber and strike against each other, thus exerting violent multidirectional more or less random shearing and shattering impacts on the carbon black.

The hard-surfaced objects employed may be of any convenient shape, but are advantageously spherical balls of metal having a Rockwell C hardness of at least 55. To particular advantage, the balls may be manganese steel having an average Rockwell C hardness (ASTM E 18-57T) of 64. Tungsten carbide steel balls and forged steel balls may also be employed.

When a vibrating ball mill is employed in the practice of the invention, it may be of the type which comprises a ball chamber supported by heavy helical springs, the chamber being violently vibrated by means of eccentric mechanisms positioned at each of the ends thereof so as to impart a rapid circular motion to the opposite ends of the ball chamber, and the balls therein, but without causing the chamber to rotate about is axis. The opposed eccentrics may be timed in phase or out of phase to an extent which is variable and dependent upon the severity of vibration required. Small-sized vibrating ball mills, equipped with an eccentric mechanism at only one end thereof, may also be employed with success.

The degree of carbon black property modification effected by my process is strongly dependent upon the ratio of the feed rates of the recirculated carbon black to the unmodified carbon black fed to the milling chamber. This ratio, hereinafter referred to for simplicity as the "recycle ratio," may be used as a means for regulating the structure and other properties of the product. Thus, when the total carbon black feed rate to the attrition mill, i.e., the sum of the recirculated carbon black feed rate and the fresh carbon feed rate, is held constant, the degree of modification of the carbon black properties increases as the magnitude of the recycle ratio increases. When using a vibrating ball mill as the attrition mill, I prefer to use recycle ratios within the range of from 1:1 to about 50:1 in order to obtain both optimum production rate and degree of modification of carbon black properties. Recycle ratios within the range of from about 2:1 to 40:1 are particularly advantageous for this purpose.

As previously noted, it is desirable that the modified carbon black product be continuously removed from the circulating stream of black at a rate equal to that at which unmodified black is continuously charged to the attrition mill, for in so doing, the total mass of carbon black in the circulating stream remains essentially constant.

It has also been found that the degree of alteration of carbon black properties is influenced by the total carbon feed rate to the mill, and, in general, equivalent or greater reduction in carbon black structure may be obtained with lower recycle ratios as the total feed rate is reduced. When a vibrating ball mill is employed as the attritioning apparatus, there appears to be advantage in conducting the process at feed rates which approach the maximum short of plugging the mill, since the ash content of the modified black, due to contamination unavoidably incidental to the milling operation, may be minimized, as may also the cost of the operation.

For a given total feed rate and recycle ratio, the degree of modification of carbon black properties is also influenced by the frequency and amplitude of vibration of the vibrating ball mill, the diameter and density of the balls, the overall size of the mill chamber, the horsepower input to the mill and the ratio, by weight, of the balls to the black in the mill.

The period of vibration of the vibrating ball mill may be as low as 500 and as high as 5000 oscillations per minute, but more advantageously should be within the range of from about 800 to 1750 per minute. The amplitude of vibration, i.e., the diameter of the circle about which the axis of the mill chamber is moved by the eccentrics, should preferably be within the range of from about ⅛ inch to about one inch, although other amplitudes may be used.

When balls are employed as the hard-surfaced objects within the milling chamber, their diameters may vary from about 1/16 inch to about one inch, and a mixture of balls of various diameters within the range just indicated, may be used. The ratio, by weight, of balls to carbon black in the milling chamber may vary from about 35:1 to about 350:1, but most advantageously within the range of about 40:1 to about 175:1.

The temperature at which the enclosed circulating stream is maintained is, quite naturally, subject to apparent physical limitations, but is, on the other hand, subject to considerable variation. For instance, when the process is conducted using a vibratory ball mill, the temperature of the circulating stream has generally been found to be between 100° to 500° F., or higher, due to the thermal energy released during the milling operation.

As previously noted the ball milling of carbon black typically results in an increase in the chemical activity of the black, as evidenced by an increase in the volatile content, in addition to a reduction of carbon black structure. This increase in chemical activity upon ball milling is believed to be due to an attack of the oxygen content of the air, which incidentially enters the system entrained within the unmodified feed black, at the reactive sites generated on the surfaces of the carbon black particles by the attritioning operation.

According to a further aspect of the present invention, it has now been found that the chemical activity of the modified black may be further increased by continuously introducing into the system, at a predetermined and controlled rate, a gas which is reactive with the black, advantageously, an oxidizing gas.

If desired, the reactive gas may be mixed with an inert diluent, such as nitrogen, to facilitate thorough distribution and mixing with the enclosed circulating black stream. The inert gas may also serve as a coolant for the circulating black, in which case the inert and reactive gases may be mixed in any suitable proportion necessary to effect cooling and reaction to the desired degree.

For instance, a controlled amount of air may be continuously introduced into the enclosed stream of black thereby further increasing the volatile content of the modified black over that obtained by ball milling alone, by reaction with the oxygen component of the air, and effecting cooling of the circulating stream of black by dilution with the nitrogen component. While air is preferred, other reactants, for instance oxygen, ozone, oxygen-enriched air, oxides of nitrogen, oxides of sulfur, halogens, ammonia, etc. may also be used to modify the chemical activity characteristics of the carbon black.

Advantageously, the air or other reactive gas is added to the enclosed black stream at a point proximal to attritioning operation, e.g., immediately upstream or down stream from the attrition mil. I prefer to term this air, "additional air," in order to distinguish it from the "entrained air" which enters the system within the interstices of the unmodified feed carbon black.

The rate at which the additional air is continuously added to the system is, of course, dependent on many factors, including the desired extent of modification of the chemical activity of the carbon black. However, for most purposes, rates of addition of from about 0.5 to 6.0 s.c.f. per pound of unmodified feed carbon black have been found to be particularly advantageous.

The temperature at which reaction between the attrited carbon black and the reactive gas is effected is, of course, dependent on numerous considerations, including the nature of the gas. When the process is conducted employing a vibrating ball mill and the reactive gas continuously added to the system is air, the temperature of the circulating stream of attrited black should advantageously be between 100° to 500° F. As previously noted, temperatures within this range are typically obtained, without heating or cooling the circulating stream of black, as a result of the thermal energy released during the vibratory milling operation.

As previously noted, the controlled introduction of additional air, or other reactive gas, into the system, enables the chemical activity characteristics of the modified carbon black to be increased over that obtained by ball milling alone at the same production rate. Thus, it is apparent that when it is desired to achieve a particular chemical activity level, for instance a particular volatile content, the controlled introduction of additional air enables the achievement of that level at substantially higher production rates.

In view of the large number of variables which have been noted above, it is, of course, not possible to prescribe precise operating conditions for accomplishing a desired result, and therefore, it is necessary to determine these conditions by experimentation.

The process of the present invention will be further described and explained with reference to the accompanying drawings which depict specific embodiments, but, of course, it will be understood that the invention is not limited thereto, since various modifications will be apparent.

Figure 2:
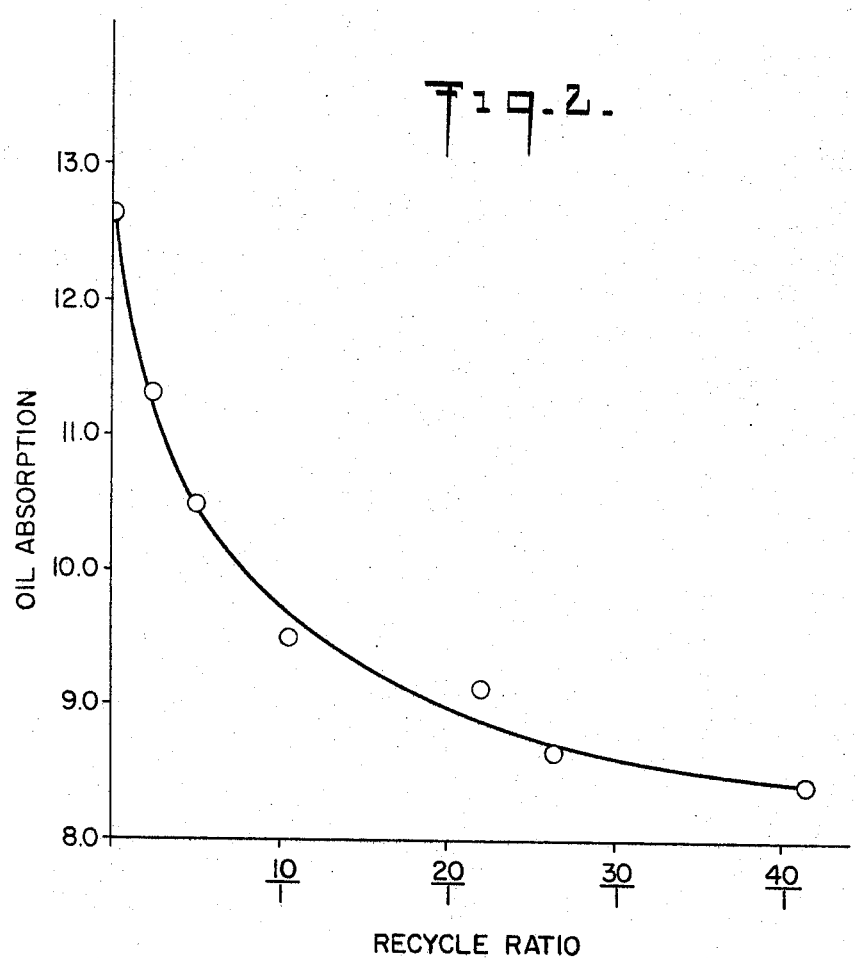

FIGURE 1 diagrammatically represents a commercial installation suitable for the practice of the invention, and FIGURE 2 is a plot illustrating the effect of varying the recycle ratio on the oil absorption property of the carbon black.

As shown in FIGURE 1, feed carbon black, which may be in either powdered or pelleted form, is introduced through loading bin 1, and is raised in bucket elevator 2, driven by electric motor 3, to a feed hopper 4. By means of a weigh belt feeder 5, a continuous measured stream of the carbon black is introduced through a leg 6 of a flow merger 7 and a supply conduit 8 to a vibrating ball mill 9, which is coupled to supply conduit 8 by flexible conduit 10 and is driven by motor 11. In the vibrating ball mill 9, the black is subjected to the attritioning action of a rapid succession of violent, multidirectional shearing and shattering impacts of steel balls or the like. The attrited carbon black leaves the vibrating ball mill 9 through discharge spout 12, which is connected to a discharge screw 13 by means of flexible conduit 14. The black is conveyed by discharge screw 13, which is driven by electric motor 15, to a second bucket elevator 16, which is driven by motor 17. By means of the bucket elevator 16, the black is transported to a surge tank 18.

The carbon black is removed from surge tank 18 through legs 19 and 20 of a flow splitter 21. One portion is continuously removed through leg 19 at a metered rate by means of rotary feeder 22, and is conveyed by recycle screw 23, driven by motor 24, to leg 25 of the flow merger 7, wherein it is combined with fresh feed black and passed through supply conduit 8 to the vibrating ball mill 9 for treatment.

Simultaneously, another portion of the black within surge tank 18 is conveyed through leg 20 of flow splitter 21 to a weigh belt feeder 26 which continuously removes the modified carbon black at a measured rate as product. The product may then be passed to a micropulverizer, pelletizer, packaging unit or other additional apparatus wherein it is subjected to additional processing steps prior to its utilization in a composition of manufacture.

In carrying out the process, untreated feed carbon black is added by means of a weigh belt feeder 5 at advantageously the same rate at which the modified carbon black product is removed from the circulating stream of black by means of weigh belt feeder 26. The two feeders 5 and 26 may be coupled together by means of electronic or pneumatic control devices, not shown, which automatically maintain the fresh feed rate equivalent to the product rate.

The rate at which modified carbon black is recirculated to the mill is regulated by means of rotary feeder 22, and is preferably greater than the rate at which unmodified feed black is introduced into the system. As previously noted and as will be further shown below, the ratio of these rates, i.e., the recycle ratio, may be employed as a means for regulating the properties of the modified black. Advantageously, this ratio is from about 2:1 to 40:1.

Thus, it can be seen that the modified carbon black product of the present process consists of carbon black particles which have been subjected to various amounts of attrition. In other words, some of the particles have been passed through the mill only once, some twice, some three times, etc. On the other hand, products obtained from previously proposed batch and continuous attritioning processes consist of particles which have been subjected to essentially the same amount of attrition.

The feed carbon black entering the closed system, of course, contains entrained air, which, for most purposes, is present in sufficient amounts to effect the desired increase in the chemical activity characteristic of the black.

However, as previously noted, the chemical activity may be increased to even a greater degree at a given production rate, or the production rate for producing a black having certain properties may be substantially increased, by continuously introducing into the system, at a predetermined and measured rate and, advantageously, at a point near the attritioning mill, a reactive gas, preferably air. For instance, "additional air" may be introduced through supply line 27 and regulating valve 28, and combined with the black in discharge spout 12 of the mill 9.

As is shown in FIGURE 1, surge tank 18 may be provided with an atmospheric vent 29, containing a filter 30, to permit the exhausting of gases from the circulating stream without the loss of carbon black.

The present process has been found especially applicable in the treating of high structure furnace blacks produced from highly aromatic liquid hydrocarbons, such as petroleum residues and tars, to reduce the reticulate chain structure of those blacks, although in its broader respects, the invention contemplates treating all types of carbon black.

Where desired, the fresh carbon black may be supplied directly from a collecting or pelleting apparatus used in conjunction with one or more carbon black production furnaces. So arranged, the fresh carbon black feed to the attrition mill may comprise all or a portion of the production from a carbon black production unit so that both systems may be integrated to operate continuously and in unison.

From the following specific, non-limiting examples it will be seen that the invention provides sufficient flexibility to permit alteration of a high structure furnace black to produce low structure types having highly active surfaces, such as are preferred for reinforcing butyl rubber; or, for producing less extensively modified types which are more suitable for use in natural rubber and styrene-butadiene rubber, for example.

EXAMPLE 1

This illustartion demonstrates how the oil absorption characteristic of carbon black may be varied and controlled by adjusting the recycle ratio. A High Abrasion Furnace black (HAF) having an oil absorption of 12.6 gal./100 lbs., was attrited in a vibratory ball mill having a 15" diameter x 18" length ball chamber and powered by a 20 HP motor. The mill was employed in conjunction with auxiliary apparatus equivalent in function to that described in reference to FIG. 1 to effect continuously and simultaneously: (1) addition of unmodified carbon black to the mill, (2) recirculation of a portion of the attrited carbon black to the mill feed inlet and (3) removal of another portion of the attrited black as product.

It will be noted from the operating data set forth in Table 1, below, that the total feed rate to the mill, i.e., the sum of the unmodified black feed rate and the recirculated black feed rate, was the same in each of the runs, but the recycle ratio was varied from 2.2:1 to 41.5:1. It will also be noted that the rates at which unmodified carbon black was added to the mill were the same as the rates at which attrited carbon black was removed from the circulating stream as product.

FIGURE 2 is a plot of the recycle ratios and corresponding oil absorption values of the products shown in Table 1.

TABLE 1

| | |
|---|---|
| Ball Size-Mixed (in.) | ⅜, ½, ⅝ |
| Avg. Ball Hardness—Rockwell C | 64 |
| Total Ball Weight (lbs.) | 350 |
| Weight Ratio—Balls/Black | 50/1 |
| Frequency of Vibration (v.p.m.) | 1160 |
| Amplitude of Vibration (in.) | ¾ |

| Run No. | Total Feed Rate (lbs./hr.) | Unmodified Black Feed Rate (lbs./hr.) | Recirculated Black Feed Rate (lbs./hr.) | Product Removal Rate (lbs./hr.) | Recycle Ratio | Oil Abs. of Product (gals./100 lbs.) |
|---|---|---|---|---|---|---|
| 1 | 850 | 266 | 584 | 266 | 2.2:1 | 11.3 |
| 2 | 850 | 146 | 704 | 146 | 4.8:1 | 10.4 |
| 3 | 850 | 73 | 777 | 73 | 10.6:1 | 9.5 |
| 4 | 850 | 37 | 813 | 37 | 22:1 | 9.1 |
| 5 | 850 | 31 | 819 | 31 | 26.4:1 | 8.6 |
| 6 | 850 | 20 | 830 | 20 | 41.5:1 | 8.4 |

Thus, as the recycle ratio was increased in value, the structure characteristic of the carbon black was further decreased, as evidenced by a lowering in the oil absorption characteristic.

As previously noted, one major advantage of the present invention is that it permits the production of attrition modified blacks at higher rates than do batch or continuous operations previously employed for this purpose.

The following example illustrates this advantage by comparing the production data and carbon black properties for an attritioned High Abrasion Furnace black produced in accordance with one previously proposed method, wherein the carbon black is subjected to attrition during a single pass through the mill, with the production data and black properties of a modified HAF carbon black produced in accordance with the invention.

EXAMPLE 2

A HAF carbon black having an oil absorption of 12.2 gal./100 lbs., a volatile content of 1.9% and a B.E.T. surface area of 99 m.$^2$/g. was attrited using the same vibratory ball mill described in Example 1 and the mill operating data set forth in the upper portion of Table 1, above. Unmodified feed carbon black was continuously charged to the mill at a rate of 266 lbs./hr. and attrited carbon black was continuously recirculated to the mill at a rate of 682 lbs./hr., thereby giving a total feed rate to the mill of 948 lbs./hr. and a recycle ratio of 2.6:1. Attrited carbon black was removed as product at a rate of 266 lbs./hr.

For comparative purposes, the same HAF carbon black was treated by subjecting a continuously flowing stream of the black to attrition during a single pass through the same vibratory ball mill at a rate of 68 lbs./hr. Thus, in this "single pass" method, all of the attrited carbon black was recovered as product. The mill operating conditions were also the same as those set forth in the upper portion of Table 1, with the exception that the weight ratio of balls to black was increased to a value of 225/1.

Table 2 below, lists the properties and performance in natural rubber of the modified carbon black produced in accordance with the present invention in comparison to the "single pass" black.

TABLE 2

| | Present Invention | Single Pass |
|---|---|---|
| Carbon Black: | | |
| Production Rate (lbs./hr.) | 266 | 68 |
| Tinting Strength | 109 | 107 |
| Oil Absorption (gal./100 lbs.) | 10.3 | 10.1 |
| Iodine Adsorption (mg./g.) | 74 | 75 |
| Volatile (percent) | 2.4 | 2.3 |
| B.E.T. Surface Area (m.$^2$/g.) | 105 | 109 |
| Properties in Natural Rubber: | | |
| 15' L-300 (p.s.i.) | 1,140 | 1,000 |
| 15' Tensile (p.s.i.) | 2,850 | 2,790 |
| 40' L-300 | 1,810 | 1,720 |
| 40' Tensile | 3,680 | 3,670 |
| 40' Elongation (percent) | 520 | 540 |
| 40' Shore Hardness | 63 | 63 |
| Rebound (percent) | 72.3 | 71.8 |
| Goodrich Flexometer ΔT. (° F.) | 70 | 73 |
| Log R | 3.8 | 3.4 |
| Dispersion [1] | 8.0 | 8.0 |
| Mooney Viscosity (ML-4'/212° F.) | 65 | 62 |
| Mooney Scorch at 250° F: | | |
| TMV+5 | 11.7 | 12.7 |
| TMV+35 | 15.5 | 16.2 |
| Rate | 7.9 | 8.6 |

[1] 1=Poor; 10=Excellent

Natural rubber compounding recipe: Parts by weight
  Smoked sheets _____ 100
  Carbon black _____ 50
  Benzothiazyl disulfide accelerator _____ 0.6
  Stearic acid _____ 3.0
  Sulfur _____ 2.5

The natural rubber performance of the carbon black produced by the process of the invention was generally superior to that of the "single pass" black; particularly in regard to the properties of heat build-up and rebound. It will also be noted that the present process enabled a production rate which was approximately 4 times as great as that of the "single pass" process to produce a modified carbon black product having substantially the same oil absorption, surface area and chemical activity properties. If a higher carbon black feed rate had been used with the "single pass" process, the degree of carbon black property modification would have been far below that obtained with the present invention.

The following example illustrates the advantages of introducing a controlled amount of "additional air" into the enclosed circulating stream of black.

EXAMPLE 3

A continuous type vibrating ball mill having a 42" d. x 48" l. ball chamber and powered by two 125 H.P. motors was used in conjunction with auxiliary apparatus as described in reference to FIGURE 1 and was operated in accordance with the related description of the invention.

In these runs it was desired to ball mill a standard HAF black having an oil absorption of 13.3 gal./100 lbs. and a volatile content of 1.3% to obtain a product having an oil absorption of from about 8 to 8.5 gal./100 lbs. and a volatile content above about 3.0%.

The operating data and results of these runs are set forth in Table 3.

TABLE 3

Ball sizes—mixed (inch) _____ ½, ⅝, ¾
Avg. ball hardness—Rockwell C _____ 64
Total ball weight (lbs.) _____ 7350
Frequency of vibration (v.p.m.) _____ 1160
Amplitude of vibration (inch) _____ ¾

|  | Run 7 | Run 8 | Run 9 | Run 10 |
|---|---|---|---|---|
| Operating Data: |  |  |  |  |
| Modified Product Rate (lbs./hr.) | 257 | 413 | 413 | 515 |
| Unmodified Carbon Feed Rate (lbs./hr.) | 257 | 413 | 413 | 515 |
| Recirculated Black Feed Rate (lbs./hr.) | 5,000 | 9,000 | 9,000 | 10,000 |
| Recycle Ratio | 19.5/1 | 21.8/1 | 21.8/1 | 19.5/1 |
| Ball to Black Weight Ratio | 73.5/1 | 41/1 | 41/1 | 37/1 |
| Rate of "Additional Air" to System: |  |  |  |  |
| S.c.f.h. | None | None | 2,040 | 1,980 |
| S.c.f./lb. Unmodified Carbon Feed | | | 4.92 | 3.85 |
| Temp. of Unmodified Feed Carbon Black, °F. | 70 | 70 | 73 | 73 |
| Temp. of Circulating Carbon Stream, °F. | 300–350 | 300–350 | 300–350 | 300–350 |
| Carbon Properties: |  |  |  |  |
| Volatile Content (percent) | 4.4 | 2.5 | 3.4 | 3.0 |
| Oil Absorption (gal./100 lbs.) | 8.2 | 8.2 | 8.3 | 8.4 |
| Ash Content (percent) | 1.81 | 1.15 | 1.17 | 1.08 |

During the Run #7, no trouble was experienced in achieving the desired oil absorption and volatile values without the deliberate introduction of air into the closed circulating system.

In Run #8, all carbon flow rates were increased substantially, while maintaining about the same recycle ratio, in an attempt to produce a modified carbon black having the desired oil absorption and volatile levels. As during Run #7, the only significant quantity of air introduced into the closed system was that incidentally absorbed in the interstices of the unmodified feed carbon black. While oil absorption was reduced to a satisfactory level, the volatile content of the modified black was below the desired minimum limit of 3.0%.

However, upon introducing additional air into the circulating system at a rate of 4.92 s.c.f. per pound of unmodified carbon black introduced into the mill (Run #9) the volatile content was raised to a satisfactory value. In reference to FIGURE 1, the additional air in this run was introduced through supply line 27 and was combined with the black in discharge spout 12 of the vibratory ball mill.

In Run #10, the carbon feed rates of Run #7 were doubled and additional air, at the rate of 3.85 s.c.f./lb. of unmodified feed carbon black, was introduced into the system and mixed with the black in the discharge spout of the mill. As can be seen from the above results, the introduction of additional air into the system enabled the production of a modified black having the desired properties at the higher production rate.

EXAMPLE 4

In this illustration, the butyl rubber properties of an attrited HAF carbon black produced in accordance with the present invention were compared with those of an attrited HAF carbon black produced by a batch operation.

Thus, the product of the present invention, which was produced using a recycle ratio of 19.5:1, was comprised of carbon black particles subjected to various amounts of attrition, while the product of the batch method was comprised of particles subjected to essentially the same amount of attrition.

In both cases, a vibratory ball mill was employed as the attritioning apparatus, and treatment conditions were adjusted to give modified products having essentially the same characteristics. Also, in both cases, the blacks were ball milled in an atmosphere of air which resulted from the air which entered the system entrained in the unmodified feed black stream: no additional air was added in either case.

The product blacks were masterbatched with butyl rubber, and other rubber compounding ingredients were added to the masterbatches by means of Banbury mixer. Tire treads of similar size and shape were manufactured from the compositions thus prepared and were applied to tires for road testing according to procedures well known in the industry.

The control composition in this tire test program comprised a commercial low structure black, and was assigned a tread wear index of 100. The higher the tread wear index value, the better the wear resistance of the tire tread.

Table 4, below, sets forth the properties of the carbon blacks, the compounding recipe, the road wear data and the physical properties of the butyl rubber stocks obtained by curing samples of each at a temperature of 290° F. The butyl rubber employed was a low unsaturation isobutylene-isoprene copolymer having a Mooney viscosity of 71+(ML-8@212° F.).

TABLE 4

|  | Commercial Low Structure Black | Present Invention | Batch Process |
|---|---|---|---|
| Carbon Black Properties: |  |  |  |
| Oil Absorption (gal./100 lbs.) | 10.2 | 8.2 | 7.9 |
| Volatile (percent) | 1.2 | 3.8 | 3.8 |
| B.E.T. Surface Area (m.²/g.) | 83 | 105 | 121 |
| Rubber Properties: |  |  |  |
| 20' Tensile (p.s.i.) | 2,450 | 2,600 | 2,250 |
| 20' L-300 (p.s.i.) | 650 | 840 | 640 |
| 60' Tensile | 2,660 | 2,975 | 2,660 |
| 60' L-300 | 1,250 | 1,510 | 1,320 |
| 60' Elongation (percent) | 560 | 585 | 525 |
| 60' Shore Hardness | 57 | 54 | 53 |
| Maximum Tensile | 2,660 | 2,975 | 2,660 |
| Road Wear: Tread Wear Index (overall) | 100 | 139 | 121 |

Compounding recipe employed: Parts by weight
- Butyl rubber _____ 100
- Carbon black _____ 50
- Zinc oxide _____ 5
- Stearic acid _____ 1
- Necton 60 (plasticizer) [1] _____ 5
- Elastopar (promoter) [2] _____ 1
- Benzothiazyl disulfide accelerator _____ 1
- Tetramethylthiuram disulfide accelerator  1
- Sulfur _____ 1.5

[1] Non-staining extracted naphthenic oil manufactured by Humble Oil and Refining Company.
[2] N-methyl-N, 4-dinitrosoaniline on inert carrier manufactured by Monsanto Chemical Company.

It will be noted from the above results that the attrited black produced in accordance with the present invention, while having essentially the same carbon black properties as the batch-attrited black, imparted higher tensile strength elongation, modulus and wear resistance properties to butyl rubber tire tread stocks.

I claim:

1. A continuous process for modifying the properties of carbon black by attritioning in a closed system which comprises:
    (a) continuously charging a feed stream of carbon black to an attrition mill and therein subjecting the black to the attritioning action of hard surfaced objects;
    (b) continuously discharging attrited carbon black particles from said mill;
    (c) subsequently indiscriminately dividing said attrited particles, thus forming first and second portions thereof;
    (d) removing said first portion from the process as the product thereof at a predetermined, measured rate, said product being composed of unclassified attrited particles removed from the mill;
    (e) recirculating said second portion to said mill in an unclassified state and at a predetermined and measured rate;
    (f) continuously charging and cojoining unmodified carbon black at a predetermined and measured rate with said recirculated second portion so as to form the feed stream continuously charged to the attritioning mill, the rate at which the recirculated attrited black is fed to said mill being at least as great as the rate at which unmodified carbon black is fed to the mill;
whereby the carbon black continuously passed through the attrition mill consists of the carbon black particles to be modified and a portion of the unclassified attrited particles which have been discharged from the mill, and the modified carbon black product consists of another portion of the unclassified attrited particles which have been discharged from the mill, and the carbon black product consists of a mixture of carbon black particles which have been subjected to an unequal number of passes through the mill.

2. Process as in claim 1, wherein the rate at which the carbon black to be modified is charged to the mill is substantially equal to the rate at which attrited carbon black is recovered as product.

3. Process as in claim 1, wherein the attrition mill is a vibratory ball mill.

4. Process as in claim 9, wherein the gas is introduced into the enclosed system at a point proximal to the attrition mill.

5. Process as in claim 9, wherein the temperature of the recirculating attrited carbon black is maintained within the range of about 100° to 500° F. and air is employed as the carbon black treating gas.

6. Process as in claim 10, wherein the air is introduced into the enclosed system at a rate within the range of from about 0.5 to 6.0 s.c.f. per pound of unmodified carbon black charged to the mill.

7. The process of claim 3 wherein the rate at which the recirculated portion of the attrited black is fed to the mill is not more than about 50 times greater than the rate at which the unmodified carbon black is fed to the mill.

8. The process of claim 3 wherein the recirculated portion of the attrited black and the unmodified black are fed to the mill at a rate ratio within the range of about 2:1 to 40:1.

9. The process of claim 1 wherein a carbon black treating gas is continuously introduced into the enclosed system at a predetermined and measured rate, said treating gas being reactive with the attrited carbon black to alter its chemical activity characteristics.

10. The process of claim 9 wherein the carbon black treating gas is selected from the group consisting of air, oxygen, ozone, oxygen-enriched air, oxides of nitrogen, oxides of sulfur, halogens, and ammonia.

11. The process of claim 9 in which the carbon black treating gas is mixed with a diluent gas, said diluent gas being non-reactive with the attrited carbon black.

12. The process of claim 3 wherein the vibrating ball mill contains steel balls as the attritioning media, said balls having a Rockwell C hardness of at least 55.

References Cited

UNITED STATES PATENTS

| | | | |
|---|---|---|---|
| Re. 13,382 | 3/1912 | Edison | 241—24 |
| 3,024,092 | 3/1962 | Gessler | 23—209.2 |

OSCAR R. VERTIZ, *Primary Examiner.*

EDWARD J. MEROS, *Examiner.*